United States Patent [19]

Fischer et al.

[11] Patent Number: 4,795,308
[45] Date of Patent: Jan. 3, 1989

[54] OBSTACLE IN FRONT OF A PROPELLER

[75] Inventors: Hans-Otto Fischer, Willich; Siegfried Hosemann, Xanten-Wardt, both of Fed. Rep. of Germany

[73] Assignee: Rhein-Flugzeugbau GmbH, Moenchengladbach, Fed. Rep. of Germany

[21] Appl. No.: 16,069

[22] Filed: Feb. 18, 1987

[30] Foreign Application Priority Data

Feb. 18, 1986 [DE] Fed. Rep. of Germany ....... 3605086

[51] Int. Cl.⁴ ............................................. F01D 5/10
[52] U.S. Cl. .................................. 415/119; 415/208; 415/216; 244/200; 244/65; 244/1 N
[58] Field of Search ................. 416/123; 415/119, 208, 415/213 C, 216; 244/1 N, 53 B, 200, 65, 67

[56] References Cited

U.S. PATENT DOCUMENTS

| | | | |
|---|---|---|---|
| 3,138,349 | 6/1964 | Piasecki | 416/123 |
| 3,273,654 | 6/1964 | Pines | 415/208 |
| 3,332,643 | 7/1967 | Toner | 416/123 |
| 3,995,970 | 12/1976 | Yamaguchi | 415/119 |
| 4,343,506 | 8/1982 | Saltzman | 244/53 B |
| 4,382,566 | 5/1983 | Brand | 244/54 |
| 4,611,774 | 9/1986 | Brand | 416/134 A |
| 4,641,799 | 2/1987 | Quast et al. | 416/91 |

FOREIGN PATENT DOCUMENTS 2636056  2/1978  Fed. Rep. of Germany ...... 415/119

Primary Examiner—Robert E. Garrett
Assistant Examiner—Therese M. Newholm
Attorney, Agent, or Firm—Ralf H. Siegemund

[57] ABSTRACT

In combination with a propeller disposed in an aircraft, aft from the nose portion of the craft, an improvement is provided for reducing noise, as well as mechanical load on the propeller blade, and includes a construction part situated upstream from the propeller and being exposed to the oncoming air flow prior to reaching the propeller, thus being an obstacle that has a particular contour in a plane transversely to an axis of rotation of the propeller, so that at least the rear edge, as seen in peripheral direction of rotation of the propeller, forms an angle that is not zero in relation to a leading edge of the propeller, when the propeller as a whole is in a horizontal disposition.

9 Claims, 3 Drawing Sheets

OBSTACLE IN FRONT OF A PROPELLER

BACKGROUND OF THE INVENTION

The present invention relates to streamlining construction parts which face a flow of air produced for example by propellers, fans or the like.

Generally speaking it is of advantage to provide propulsion units such as air propellers or fans behind the object to be moved by the propulsion such as a fuselage or even just air foils fans or the like. The specific advantage of this arrangement (rather than placing the aerodynamic propulsion unit in front of these parts) is to be seen in that a certain suction obtains, causing the flow and flow pattern to straighten so as to permit formation of fairly long and coherent laminar boundary layers. in addition, these parts, which are situated in the oncoming flow, will, therefore, not be positioned in an area of rather high jet flow speeds and remain, thus, free from the influence of turbulence, eddies or the like, as they usually occur downstream from an aerodynamic propulsion unit. This explains the higher efficiency of propulsion units when operating by way of "pushing" rather than "pulling".

Static reasons, however, provide constraints on parts to be placed upstream from the aerodynamic propulsion unit, and depending upon the shape and dimension, a certain downstream flow deformation obtaines which increases with higher speeds, and flows off downstream in the plane of the propeller. This locally limited zone has a lower speed in the surrounding free uncoming flow which causes a jump in the effective angle of attack on penetration by the propeller blade and, therefore, produces rotational noise which is a well known phenomenon. Owing to this jump in the angle of attack, moreover, lift as well as drag jump accordingly. This may lead to undesired vibrations in the propeller and is detrimental on the long duration strength of the blades. Also, their tensioning as well as any connecting elements for adjusting the blades likewise experience these vibrations in a detrimental fashion, at least as long duration effects are concerned.

Aircraft which are expected to reach high speeds, and which, therefore, require a correspondingly high angle of attack of the rotor blades, may, moreover, produce a separation of the flow in that downstream flow pattern deformation. That, of course, leads to particularly high loads on the propeller blades. Another consequence of high aircraft speeds is a noticable increase in the rotational resistance of the propeller, because per revolution a braking effect obtains which is proportional to the product of the number of blades and of the number of interfering bodies in the flow path. This, of course, degrades the forward propulsion effectiveness.

Any counter measures for these problems and developed thus far for tending to overcome the drawbacks outlined above, have lead, for example, to an increase in the distance between the trailing edge of the particular "obstacle" and the rotational plane of the propeller. Also, the propeller blades have been shaped particularly in order to avoid one or the other of the drawbacks outlined above, and one has, for example, attempted to use sickle-shaped arrowhead-like propeller blades so that the downstream flow pattern deformations will at least no longer be the entire length of the propeller but is, so to speak, sectionalized and, therefore, these sections are penetrated one after another. This is, for example, disclosed and described in German Pat. No. 26 36 056. The configuration of the propellers, and particularly of shrouded propellers in the manner described in that patent, however, is limited for reasons of the statics involved. This is particularly the case when the propeller is expected to have to take up a high load and is adjustable.

DESCRIPTION OF THE INVENTION

It is an object of the present invention to avoid the drawbacks and problems outlined above, such drawbacks being observable particularly whenever construction parts are placed in an upstream flow of a propeller, under particular configuration of these parts at least to the extent they interact with the flow.

In accordance with the preferred embodiment of the present invention, it is suggested to provide one or more of the following features concerning particular configurations of such obstacle paths being situated upstream from a propeller or fan and for some reason or another directly ino the flow path of oncoming air, there being flow lines which lead directly into the propeller circle.

The primary feature is an orientation of such an obstacle part or parts, at least as to their (vis-a-vis the propeller axis) radial outer contour in the plane of rotation, to have a nonzero, acute angle (at least 10 degrees) relative to the radial extension of the propeller blade when in a horizontal position. The obstacle part may be sickle shaped or straight but does not have to be a radial line. The propeller itself may also be sickle shaped in which case the nonzero angle is measured on a radial outermost tangent line of the propeller when, as a whole, in a horizontal position.

The second feature that can be used by itself or in conjunction with the foregoing is, shaping at least the trailing edge of the obstacle part as far as the oncoming flow is concerned so that a pre-spin or -vortex is imparted upon the oncoming flow. The third feature is a NACA inlet at the trailing of the obstacle e.g. the wing on the downside of the propeller.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 9b is a cross-section through the NACA portion, the section being along line A—A in FIG. 9a.

Figure 1:
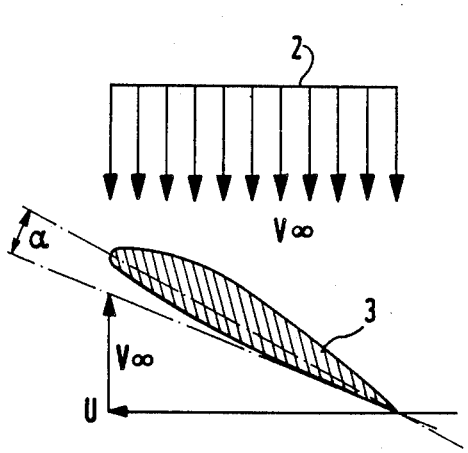
FIG. 1 illustrates a section through a propeller with an angle of attack alpha, resulting from the peripheral propeller speed u and the undisturbed, oncoming flow speed v infinite, in vector addition and in relation to the blade itself.
Figure 2:
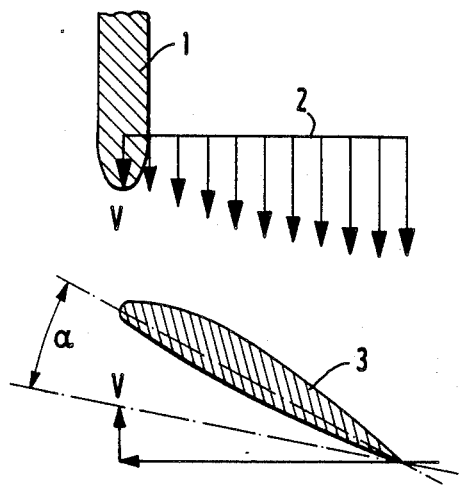
FIG. 2 is analogously a section through a propeller, including, however, a construction, part (obstacle), which interfers with that oncoming flow shown as an undisturbed pattern in FIG. 1.

Proceeding now to the detailed description of the drawings, reference is made first to FIG. 1. Herein, reference numeral 2 refers to a flow field relative to the propeller and other parts of an aircraft, which, at this point, is undisturbed generally exhibiting basically uniform speed of that airflow. In the lower portion of FIG. 1 a vector diagram is plotted wherein U is the rotational vector for the propeller having a blade 3 but which is superimposed upon the relative speed V-infinity. The propeller 3 has an angle of attack alpha, relative to the trailing edge. Generally speaking and now in accordance with the first embodiment or example of the invention shown in FIG. 2, a construction part or obstacle 1 of general design is assumed to be situated in the oncoming flow field. The flow field is now disturbed so that the angle of attack of the propeller blade is increased.

Figure 3:
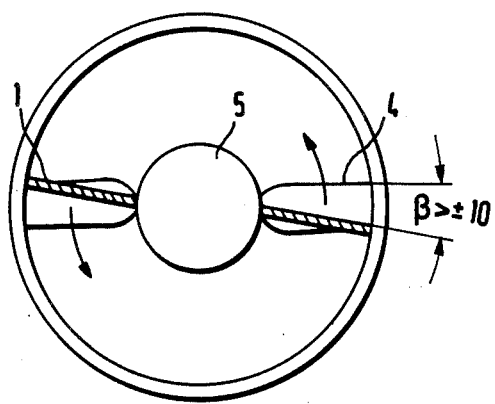
FIG. 3 illustrates a propeller with hub, shroud, and propeller blades, as well as obstacles in the oncoming flow which construction or obstacle parts are oriented in an angle beta to the leading edge of the propeller in accordacne with an aspect of the preferred embodiment of the present invention for practicing the best mode thereof.
Figure 4:
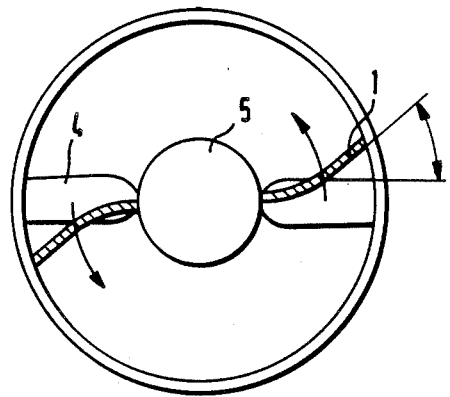
FIG. 4 is basically similar to FIG. 3, but showing a sickle-shaped construction part placed in the oncoming flow of the propeller such that the rules of the invention are still observed.

That part 1 is configured so that its trailing edge as far as the oncoming flow is concerned and as seen in the direction of rotation of the propeller, has a relatively large angle beta (at least 10 degrees) relative to the leading edge of the propeller 3 or of fan blade, or shrouded propeller, as shown in FIG. 3. The trailing edge may be configured in sickle-shaped, as shown in FIG. 4 whereby the largest angle beta obtains in the blade peak area and on the outermost zone or area of obstacle 1.

Figures 5, 6:
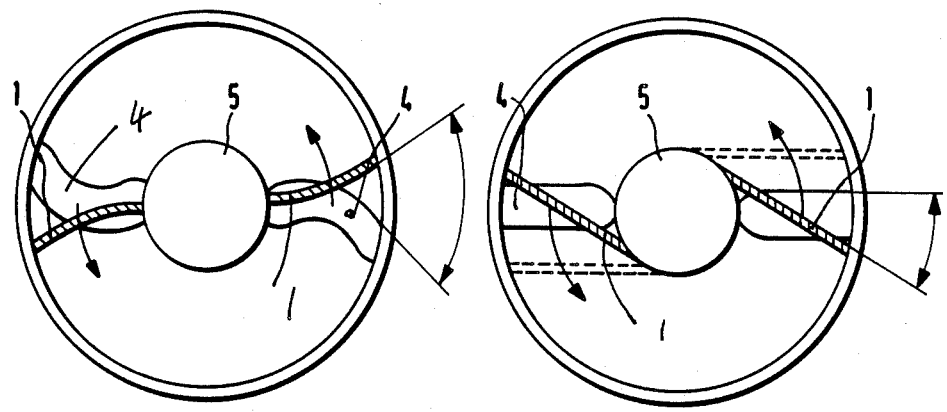
FIG. 5 is a view similar to FIGS. 3 and 4, but showing a sickle-shaped propeller blade, as well as a sickle-shaped construction part in the oncoming flow of the propeller.
FIG. 6 is similar to FIG. 3, but with a construction part in the oncoming flow, which is not radially in line with the rotational point or center of the propeller.

As stated above, German Pat. No. 2,636,056 discloses a sickle-shaped propeller. This kind of a sickle-shaped propeller, be it of the fan or the shrouded variety, can also be used in conjunction with the invention as shown in FIG. 5. Here then the critical angle beta is measured between the curved part of the obstacle 1 near the shroud and the outer portion of the sickle-shaped propeller 4, again assuming the propeller is in a horizontal position. It was found that this kind of an arrangement is very beneficial for reducing noise.

In accordance with FIG. 6, the obstacle part which is upstream from the propeller, has a particular angle maintained throughout and does not converge, so to speak, towards the center of rotation, so that the desired angle obtains throughout as indicated. These various examples of FIGS. 3 through 6 illustrate various instances of contouring the cross-section of the obstacle 1 so as to have a nonzero angle beta, at least in the radial outer part of that obstacle as projected into the plane of the rotating propeller, the angle being measured against the propeller as a whole or its radial outer portion when the propeller i.e. its leading edge is in the horizontal position. The disturbed flow in the rear of the obstacle has an orientational component (projected into the plane of the propeller) such that the propeller as a whole does not cut through that disturbed flow field at once but sequentially, beginning more radially inwardly and progressively through more radially outer zones. This graduation is deemed to be instrumental in the suppresion of noise and vibration producing effects.

Figures 7, 8:
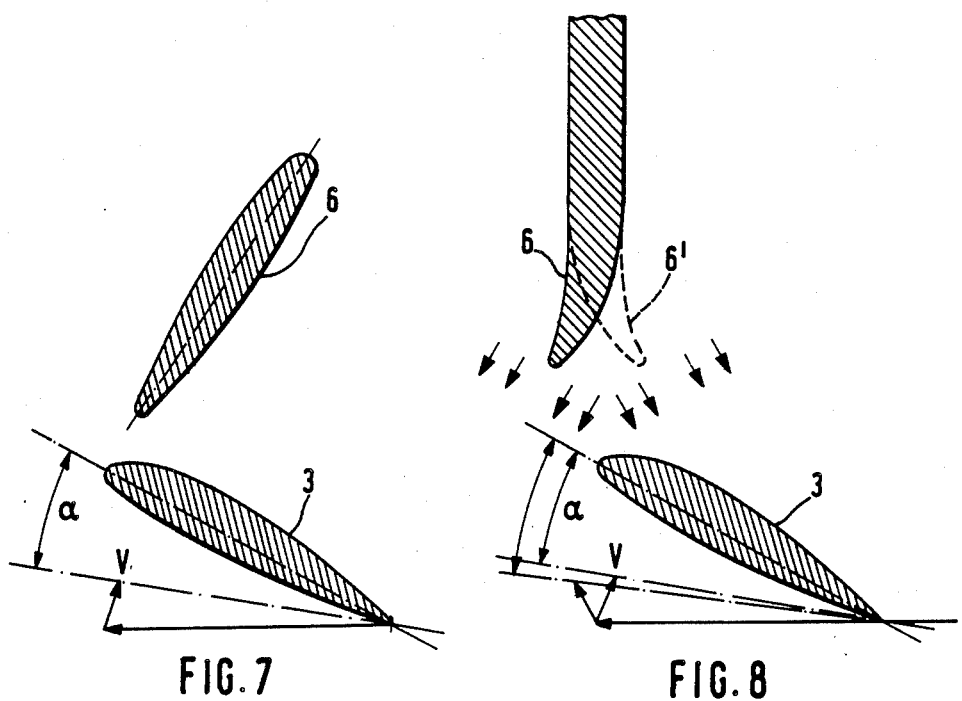
FIG. 7 is a section view through a propeller as well as through a part positioned in the oncoming flow leading to the propeller, which is aerodynamically contoured and, owing to a particular angle in relation to the undisturbed flow, provides a forward spin (angular momentum)
FIG. 8 is similar to FIG. 7, but the obstacle part which is in the oncoming flow, has a differently contoured configuration.

A second (supplemental or independent) way of obtaining the desired result will be explained with reference to FIGS. 7 and 8. First of all, it is to mention that the rear part of the obstacle is to be configured as a so-called pre-spin or pre-vortex generator. This is effective for the following reasons. The above mentioned undesired noise and the production of the additional force is attributable to the jump in the angle of attack as outlined above. Particularly here, this jump obtains from the difference of the undisturbed flow (FIG. 1), and the disturbed flow in the wake of the upstream obstacle (FIG. 2) for constant peripheral speed of the propeller 4. The magnitude of the wake 2 is a representation of the aerodynamic resistance offered by the obstacle and cannot, by and in itself, or can hardly be controlled without some additional steps, such as blowing or sucking. Moreover, such step will require control equipment, because blowing or sucking in terms of volume and speed has to match the respective air speed, altitude and so forth. However, the above described angle difference and, therefore, of any resulting jump in pressure is made possible presently through change of the flow direction in the disturbed zone. This obtains through the specific configurations, depicted in FIGS. 7 and 8, wherein the rear part of the obstacle 1 is configured as pre-spin or vortex generator.

To obtain a uniform pressure distribution, i.e. a distribution which remains uniform as much as possible during propeller and blade revolution, the current rear edges of the obstacle should match as far as their pre-spin generating angle is concerned the distribution of inclination of the propeller blade. The obstacle part is thus curved in a plane that includes the propeller axis to superimpose a vortex upon the oncoming flow. This pre-spin generation is also usable whenever the exhaust and jet producing gases are in some form run through the area covered by the (rotating) propeller circle 7. This is done in order to avoid the production of additional noise. The combination of configuring the rear edge of interfering body, as a swept back or sickle-shape, while being constructed as a pre-spin generator, is realizable as stated, in an advantageous manner and does not require additional equipment. The production of a pre-spin or vortex by means of flaps, grids, cascades or the like, is, of course, possible either in addition to other equipment or in the alternative. On the other hand it can readily be seen that the contouring and angle-forming as per FIGS. 3 to 6 and as to FIGS. 7 and 8 are carried out, so to speak, in different planes. In fact the plane of obstacle curving for the pre-spin and vortex generation as per FIGS. 7 and 8 is at right angles to the plane of the drawing of FIGS. 3–6 and vice versa. Thus, these features can be combined. Specifically an obstacle can (and should) be configured so that the propeller blade slash gradually, progressively radially outwardly through the wake flow field (FIGS. 3-6) while the same part superimposes a vortex upon the air flow just prior to reaching the propeller matching the inclination in the vortex producing propeller blades contour.

Figure 9A:
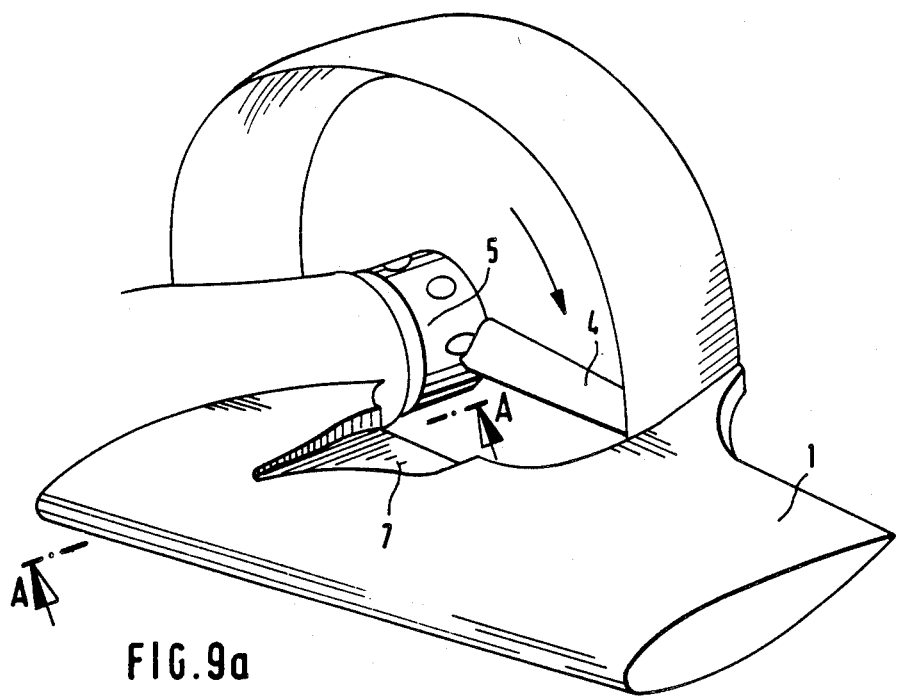
FIG. 9a is a perspective view of a shrouded propeller, aft of a fuselage as well as of a wing, the wing is assumed to have a so-called NACA contour.
Figure 9B:
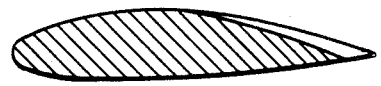
Figure 10:
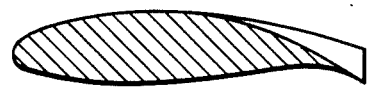
FIG. 10 is a cross-section similar to FIG. 9b, but with additional bulging for spin production.

A third kind of configuration is to be seen in that the particular obstacle part, for example, the wing itself is provided with a so-called NACA inlet, 6, being situated very close to and in the area of the oncoming flow towards the propeller in order to obtain a high energy flow by means of the formation of eddies or vortices. These eddies in accordance with FIGS. 9a and 9b are guided into the wake flow 2 so that a certain smoothing of the oncoming flow obtains. In the case of associating the NACA 6 with the propeller, one has to take into consideration that this inlet is installed on that side of the respective component being oriented opposite the center of rotation of the propeller i.e. on the down flow side of the propeller. Depending upon the diameter of the propeller as well as on the number of interferring obstacles, one can use several NACA inlets. Moreover, feeding the high energy flow as produced by means of such an NACA inlet may incorporate the earlier configurations for producing a pre-spin situation, which aspect is shown in FIG. 10. The first mentioned feature is realized in FIG. 9a in that the trailing edge 7a of the NACA inlet has the angle beta to the propeller 4 whenever the latter is in a horizontal position.

The invention is not limited to the embodiments described above, but all changes and modifications thereof, not constituting departures from the spirit and scope of the invention are intended to be included.

We claim:

1. In combination with a propeller disposed in an aircraft aft from the nose portion of the craft, the improvement of reducing noise as well as mechanical load on the propeller blade, comprising:

a construction part situated upstream from the propeller and exposed to the oncoming air flow prior to reaching the propeller thus being an obstacle, having a contour in a plane, transversely to an axis of rotation of the propeller so that at least the rear edge as seen in peripheral direction of rotation of the propeller, forms an angle (beta) that is not zero in relation to a leading edge of the propeller, when the propeller as a whole is in a horizontal disposition; and a NACA inlet in said obstacle ending at a trailing edge of said obstacle, outside of the propeller, and being arranged in relation to the propeller, as far as its rotation is concerned, that it is opposite to the sense of rotation of said propeller.

2. The improvement as in claim 1, wherein the obstacle is at least at its trailing edge curved in sickle configuration, the largest angle occuring at the front of the blade.

3. The improvement as in claim 2, wherein the propeller blades are likewise of sickle-shape along the trailing edge.

4. The improvement as in claim 1, wherein said obstacle is curved in a plane that includes the axis so that the oncoming flow as it reaches the propeller has an overall eddie and spin in the direction of rotation of the propeller.

5. The improvement as in claim 1, wherein at least the trailing part of said obstacle has a camber such that a pre-spin of air obtains in direction of the rotation of the propeller.

6. In combination with a propeller disposed in an aircraft aft from the nose portion of the craft, the improvement of reducing noise as well as mechanical load on the propeller blade; comprising:

a construction part situated upstream from the propeller and exposed to the oncoming air flow prior to reaching the propeller thus being an obstacle, having a contour in a plane that includes an axis of rotation of the propeller so that at least a trailing edge of that obstacle as seen in direction of an oncoming airflow imparts a pre-spin and vortex upon that air flow; and said obstacle including a NACA inlet, ending at a trailing edge of said obstacle, outside of the propeller, and being arranged in relation to the propeller, as far as its rotation is concerned, that it is opposite to the sense of rotation of said propeller.

7. The improvement as in claim 6 wherein said obstacle has a contour in a plane transversely to said axis of rotation of the propeller so that at least the rear edge as seen in peripheral direction of rotation of the propeller, forms an angle that is not zero in relation to a leading edge of the propeller, when the propeller as a whole is in a horizontal disposition.

8. In a combination with a propeller disposed in an aircraft aft from the nose portion of the craft, the improvement of reducing noise as well as mechanical load on the propeller blade, comprising:

a construction part situated upstream from the propeller and exposed to the oncoming air flow prior to reaching the propeller thus being an obstacle, having a NACA inlet, ending at a trailing edge of said construction part, outside of the propeller, and being arranged in relation to the propeller, as far as its rotation is concerned, that it is opposite to the sense of rotation of said propeller.

9. The improvement as in claim 8, wherein said obstacle has a contour in a plane transversely to said axis of rotation of the propeller so that at least the rear edge as seen in peripheral direction of rotation of the propeller, forms an angle that is not zero in relation to a leading edge of the propeller, when the propeller as a whole is in a horizontal disposition.

* * * * *